United States Patent [19]

Détriché

[11] Patent Number: 4,642,447
[45] Date of Patent: Feb. 10, 1987

[54] PROCESS FOR THE RESETTING OF THE PATH OF A MEMBER AND APPARATUS FOR PERFORMING THIS PROCESS

[75] Inventor: Jean-Marie Détriché, Montesson, France

[73] Assignee: Commissariat a l'Energie Atomique, Paris, France

[21] Appl. No.: 731,973

[22] Filed: May 8, 1985

[30] Foreign Application Priority Data

May 11, 1984 [FR] France ............................... 84 07329

[51] Int. Cl.⁴ .............................................. B23K 9/12
[52] U.S. Cl. .............................. 219/124.34; 219/125.1; 318/568; 901/3; 901/42
[58] Field of Search ....................... 219/124.34, 124.22, 219/3, 125.1; 901/42, 4; 318/568

[56] References Cited
U.S. PATENT DOCUMENTS 4,517,653 5/1985 Tsuchihashi et al. ................. 901/42

FOREIGN PATENT DOCUMENTS 57-58980 4/1982 Japan .............................. 219/124.34
58-122179 7/1983 Japan .............................. 219/125.1

Primary Examiner—Clifford C. Shaw
Attorney, Agent, or Firm—John F. McKenna

[57] ABSTRACT

Apparatus for resetting the path of a member comprises a member and a position detector, fixed to a carrier via a system comprising at least one carriage. The position detector supplies at least one signal representing the distance between the member and the line to be followed in a given direction. The apparatus includes for each direction, a carriage for translation of the member in said direction, a position coder associated with the carriage, a servocontrol arrangement to position the member in said direction and switches for locking the position of the member relative to the carrier for making the member dependent either on a reference position with respect to the carrier, or on a reference position with respect to the line to be followed by cancelling out the distance variation signals from the position detector. The process steps carried out by the apparatus are also disclosed.

4 Claims, 10 Drawing Figures

PROCESS FOR THE RESETTING OF THE PATH OF A MEMBER AND APPARATUS FOR PERFORMING THIS PROCESS

BACKGROUND OF THE INVENTION

The present invention relates to a process for the readjustment or resetting of the trajectory or path of a member actuated for automatically following a line described with respect to an object, as well as to an apparatus for performing this process.

The invention more particularly deals with the problem of resetting the path of a welding head with respect to a joint constituted by the juxtapositioning of two parts. However, this application is not limitative and the invention can be used for solving any other problem connected with the resetting of the path of a member with respect to a line described relative to an object.

The invention can consequently equip all industrial robots requiring a precise positioning of a member along a line described relative to an object and whose position can be detected by a sensor.

The development of robotics corresponds to the need to increase production in all industrial fields, where the flexibility of the robot is utilized for adapting to certain production types on large batches or lines. This development consequently corresponds to the reduction of organisational and planning constraints linked with the production of small and medium size batches or lines. Finally, robotics makes it possible to solve problems produced by unhealthy or dangerous working conditions.

Industry has a great need for such highly developed handling, manipulating or production means. In particular, arc welding, with or without a filler metal, leads to several specific problems making it necessary to develop automatic machines or robots suitable for this procedure. In the welding field, it is often necessary to follow the joint to be welded between two metal sheets with a very high degree of precision, while this must take place in fast and reproducible manner. Thus, it is known that the assembly, by welding, of a large number of elements with a high degree of precision and without any possibility or repair or error, requires highly skilled, difficulty obtainable, manpower. It is often impossible to ensure intense production, due to the fatigue and physical constraints resulting from the precision required. When the parts to be welded are very large, it is often necessary for them to be preheated prior to welding, which makes it necessary for the welder to wear protective clothing in order to approach them. Thus, unhealthy and dangerous working conditions occur. When welding is carried out between heat-deformable elements, any automatic welding machine or robot programmed to a very accurate path cannot adapt to these deformations, which can reach several centimeters in certain cases.

It is then necessary to provide means for bringing the member onto the line to be followed which differs, due to these deformations, from the stored or preset path. The Applicant has proposed in French Patent No. 8,005,909 filed on Mar. 17, 1980 a process for the positioning of a member relative to a metal surface and to a line formed on said surface. According to this earlier invention, a member is displaced by a robot along a stored path and is automatically reset by an auxiliary device inserted between the end of the robot and the member to a predetermined value with respect to the distance separating the member from the surface and the lateral displacement of said member with respect to a line formed on said surface.

In order to bring the member onto the line to be followed, a position detector is added thereto, which informs the system of the value of the aforementioned quantities. Servocontrol means are provided to bring the member from its real position, which is a function of the stored trajectory, to its correct position, which is defined by the predetermined values. This path following process involves bringing the member permanently onto the path to be followed, when the latter differs from the stored path.

The process of the invention is of a different type and consists of resetting the member before following the stored path. To this end, it comprises a position detector and means controlling a movement of the member relative to the carrier of said member in accordance with at least one direction contained in a plane transverse to the forward movement direction of the member.

Complex robots are known making it possible to reset paths on a line to be followed and which can move in a parallel or non-parallel manner to the stored line. This can be obtained by having a direct action on all the degrees of freedom of the robot in question, which implies a possibility of inputting information into the robot control system and more particularly a possibility of modifying certain points of the paths stored by the robot. Such robots are generally expensive.

The object of the invention is to propose a simple and economic device, which can be adapted to most robots not having means for receiving control signals from the outside.

SUMMARY OF THE INVENTION

The present invention relates to a process for the resetting of the path of a member fixed to a carrier forced to automatically follow a stored line, the object of the process being to reset the member to a real line described with respect to an object and which can diverge from the stored line, the position of the line to be followed on the object being indicated by a resetting position associated with the object, wherein the process comprises displacing the carrier relative to the object to bring it into a stored resetting position, measuring by means of a position detector fixed to said member, the distance separating the stored resetting position from the resetting position associated with the object, translating said member relative to the carrier and the object in order to cancel out said distance, locking the member relative to the carrier in the reset position and displacing the carrier relative to the object to bring it to the start of the stored path, the member thus being positioned on the line to be followed, e.g. at the start.

According to a preferred feature, the resetting position associated with the object is a point on the line to be followed, e.g. the start thereof.

The process according to the invention is performed by a resetting apparatus, wherein it comprises a position detector fixed to the member and supplying at least one displacement signal for the member relative to the real line, said position detector and said member being fixed to the carrier via a system incorporating at least one carriage for the translation in a given direction of the member and the position detector relative to the carrier, said system comprising, for each carriage, means for the translation of the member, a position coder associated with said displacement means, a servocontrol chain or loop of the position of the member along said translation direction and switches for locking the position of the member relative to the carrier or for making said member dependent either on a reference position with respect to the carrier, or on a reference position with respect to the line to be followed by cancelling out distance variation signals from the position detector.

According to a secondary feature, the switches are controlled by binary signals produced by the robot guiding the member.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENT

Figure 1A:
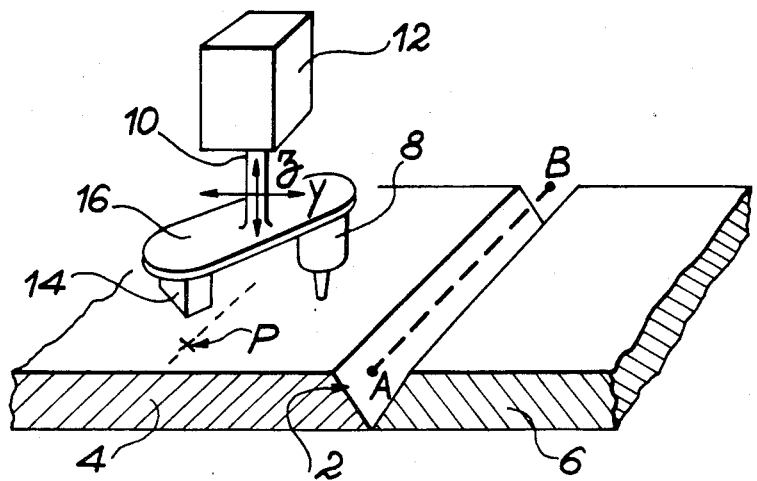
FIGS. 1a and 1b show the phase of learning by a robot of a path described with respect to an object.

Before describing an embodiment of the path resetting apparatus according to the invention, brief details will be given of the way in which the path which the member has to automatically follow is stored. The learning of this path will be described relative to FIGS. 1a and 1b, taking the example of following a joint by a welding torch.

The path to be stored is represented by a straight line segment AB. In a more general manner, the process according to the invention can apply to any path having a limited curvature. This path corresponds to the direction of a joint 2 formed by the juxtapositioning of two chamfered parts 4, 6. The member which has to follow this path is a welding torch 8 fixed by a spindle 10 and a support 16 to a crossed carriage system 12. A position detector 14 is also fixed to support 16. It is used for learning the line to be stored and for resetting the torch to the line to be followed during the restitution of the stored line. The crossed carriage system 12 makes it possible to displace the welding torch 8 and the position detector 14 relative to a robot carrier (not shown) from which system 12 is suspended in two orthogonal directions Y and Z defined relative to the carrier. The detection plane and the measuring axes of the sensor are parallel to plane YZ. During the programming of the robot, it is ensured that the detection plane is transverse to the line to be followed.

Learning the path takes place in the following way. The welding torch 8 and position detector 14 are kept locked in a reference position with respect to the carrier. The displacement of the carrier is then controlled in a conventional manner, e.g. using a button box (not shown) by an operator, in order to bring the position detector 14 to the right of a resetting point P (FIG. 1a), the detection plane being transverse to the line to be followed or to the reference line.

This point P is a point on the object, i.e, parts 4 and 6 which, during the restoration of the path, makes it possible to reset the welding torch onto the real line to be followed. This resetting point is a random point on the object on which the position detector can be made positon dependent. In practice, it is often simpler to choose as the resetting point a point on the stored path AB and in particular one of the end points A or B. However, this is not imperative and it could be preferable in certain cases to choose a resetting point not on path AB.

The displacement of position detector 14 to the right of point P defines a resetting position of the carrier or torch in a plane perpendicular to segment AB. The resetting position along axes Y and Z is determined by the displacement of the carrier along these axes. It is ensured that in the resetting position defined during learning, the distance variation signals from the detector are zero. The resetting position along axis Z defines the altitude of the welding torch above parts 4 and 6. The coodinates and orientation of the carrier in this resetting position are stored.

Figure 1B:
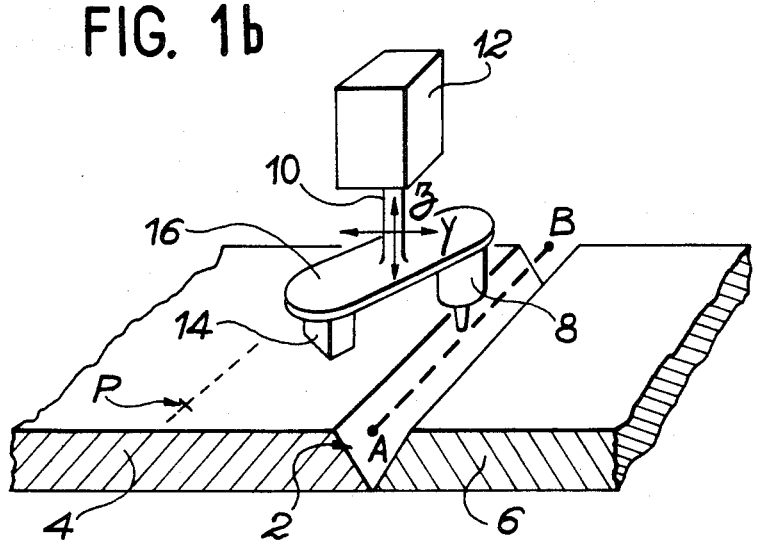

The carrier is then displaced by controls on the button box, in order to position the welding torch to the right of point A, which is the start of the path to be stored. It is then displaced by controls on the button box, in order to place the welding torch 8 to the right of point B (FIG. 1b). The path of the carrier corresponding to the path AB of the torch is stored.

This stored path determines the line automatically followed by the welding torch fixed to the carrier in the reference position, so that it is defined in a reference frame linked with the robot. However, the line to be followed by the welding torch, i.e. the direction and position of the joint depends on the position of the two parts 4 and 6 relative to the robot It is obvious that this direction and this precision are not identical for all the parts to be welded. The line to be followed by the welding torch 8 consequently does not generally correspond to the stored path, but it is approximately parallel thereto. As a result, it is necessary to reset the welding member 8 on the line to be followed, when the lateral deviation or variation is excessive.

Figure 2:
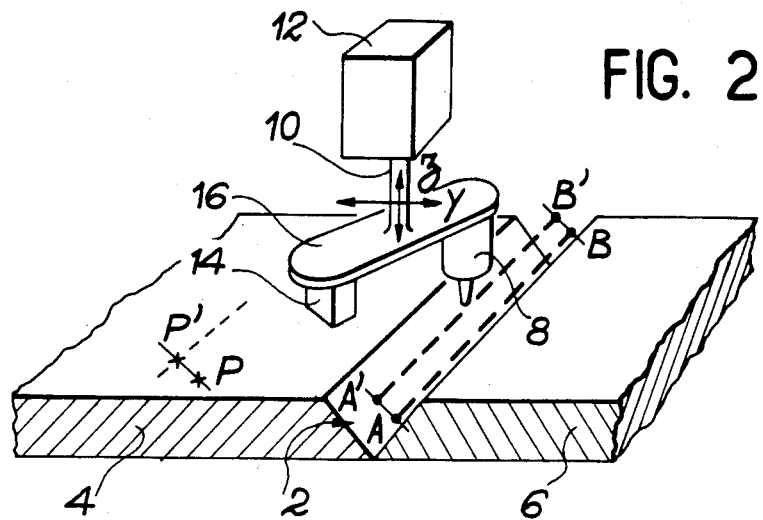
FIG. 2 illustrates the resetting of the member and the restoration of the path stored by the robot.

According to the invention, this resetting takes place prior to welding using servocontrol means for the position of welding torch 8 and also a position detector. The diagram of FIG. 2 provides an explanation of the operating principle of the resetting apparatus according to the invention. In FIG. 2, the elements identical to those of FIGS. 1a and 1b carry the same references.

The line to be followed by welding torch 8 is represented by a segment A'B'. It is also possible to see the segment AB representing the path stored by the robot or more precisely the path of the welding torch 8 corresponding to the stored path of the carrier, the welding torch being fixed in the reference position to said carrier. It is also possible to see the resetting point P' of parts 4 and 6 and the position of the resetting point P stored during learning.

The path is restored in the following way. The welding torch 8 and position detector 14 are kept locked with respect to the carrier, which is automatically brought into the stored resetting position P. Then, as a function of signals positioned by position detector 14, the crossed carriage system 12 displaces the welding torch—position detector assembly with respect to the carrier in order to bring the position detector into the resetting position P' linked with parts 4 and 6. This is brought about by the servocontrol of the displacements along axes Y and Z, so as to cancel out the distance variation signals from the detector. The welding torch—position detector assembly is locked relative to the carrier in said reset position.

The carrier then being displaced at the start of the stored path, the welding torch is positioned to the right of point A' forming the start of the path to be followed. If the resetting on point P had not been carried out, the torch would have been positioned to the right of point A and welding would have taken place on path AB.

The restoration of the stored path of the carrier consequently leads to the following of path A'B' by the welding torch.

Figure 3:
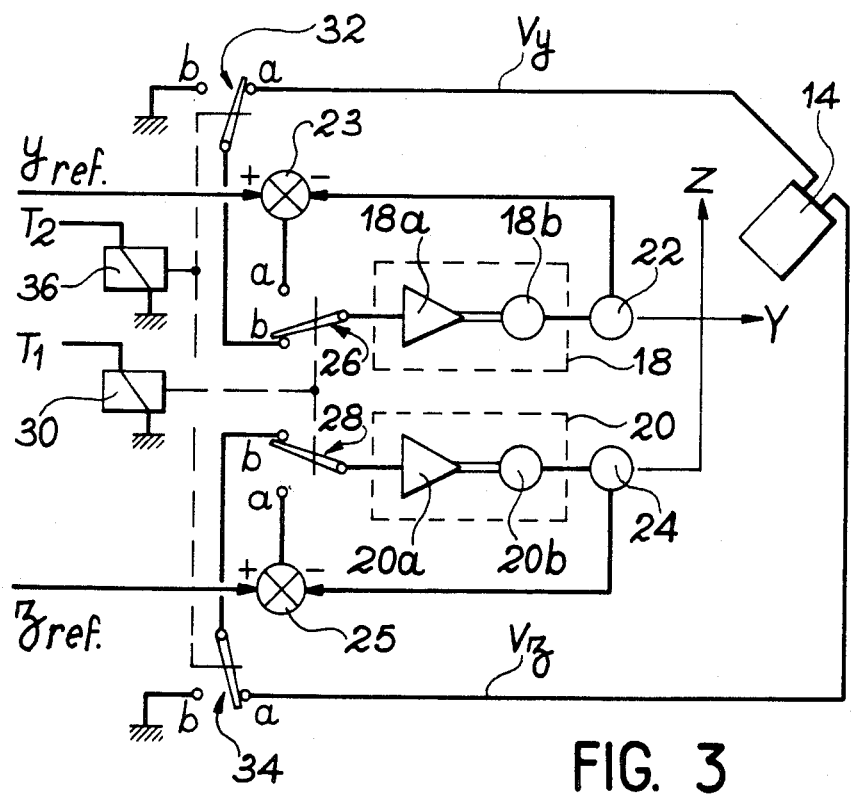
FIG. 3 is a diagram of the electric circuit for the servocontrol and/or locking of the position of the member as a function of signals from the position detector and control signals from the switches.

A description will now be given with reference to FIG. 3 of an embodiment of the apparatus according to the invention making it possible to displace the welding torch in order to obtain path A'B'.

This apparatus comprises a first displacement means 18 along axis Y constituted by an amplifier 18a and a motor 18b for the displacement in translation of carriage Y and a second displacement means 20 along axis Z constituted by an amplifier 20a and a motor 20b for the displacement in translation of carriage Z, said displacement means constituting the basis elements of the crossed carriage system permitting the displacement of the welding torch and the position detector relative to the carrier.

The apparatus also comprises a position coder or encoder 22 associated with the first displacement means 18, a subtracter 23 whose positive input receives a reference signal $y_{ref}$ and whose negative input receives the signal supplied by the position coder 22, a position coder or encoder 24 associated with the second displacement means 20, a subtracter 25 whose positive input receives a reference signal $z_{ref}$ and whose negative input receives the signal supplied by the position coder 24 and the position detector 14 supplying signal $V_y$ and $V_z$.

Finally, it comprises switches 26, 28 controlled by a relay 30 and switches 32, 34 controlled by a relay 36 making it possible either to lock the welding torch in the reference position with respect to the carrier, or to make the welding torch dependent on the line to be followed A'B', or to lock the welding torch relative to the carrier.

Switch 26 can connect either the output of subtracter 23 to displacement means 18, or switch 32 to displacement means 18, the other end of switch 32 being connected either to earth, or to the position detector 14. Switches 28 and 34 respectively have the same effect on direction Z as switches 26 and 32 on direction Y. This apparatus makes it possible to very simply restore the path A'B' by the control of switches 16, 28, 32 and 34.

In order to present the welding torch and the detector in the reference position before restoring the path, it is merely necessary to energize relay 30, in such a way that switches 26 and 28 are in position (a). The position of the welding torch is then made dependent on axes Y and Z by reference voltage signals $y_{ref}$ and $z_{ref}$. The welding torch is then in the reference position with respect to the carrier. The latter is then brought into the resetting position, which positions the position detector at the stored resetting point P.

Switches 26 and 28 are then brought into position b and switches 32 and 34 into position (a) by an adequate control on relays 30 and 36. In this state of the apparatus, each displacement means 18, 20 receives a signal supplied by position detector 14. Thus, there is a displacement of the welding torch and the position detector relative to the carrier until the signals from the position detector are cancelled out, which occurs when it faces resetting point P'. Switches 32 and 34 are then returned to position b by an adequate control on relay 36, in order to lock the position of the welding torch and the position detector on the reset position. The control signals $T_1$ and $T_2$ of the relays can advantageously be binary signals produced by the robot.

It was stated hereinbefore that the resetting position P is a random point on the object on which the position detector can be position-dependent. Throughout the remainder of the text, the special case will be assumed where said resetting point is a point of trajectory or path AB. Resetting then consists of placing the position detector in the axis of the joint.

Figure 4A:
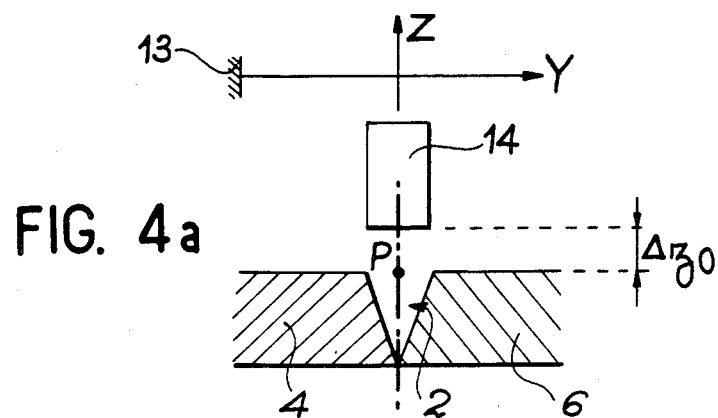
FIGS. 4a, 4b and 4c are sectional views of a joint and a position detector, respectively, showing the time at which the member is in the reference position, the time in which it is displaced following a movement parallel to the stored path and the time in which it is reset onto the line to then be followed.
Figure 4B:
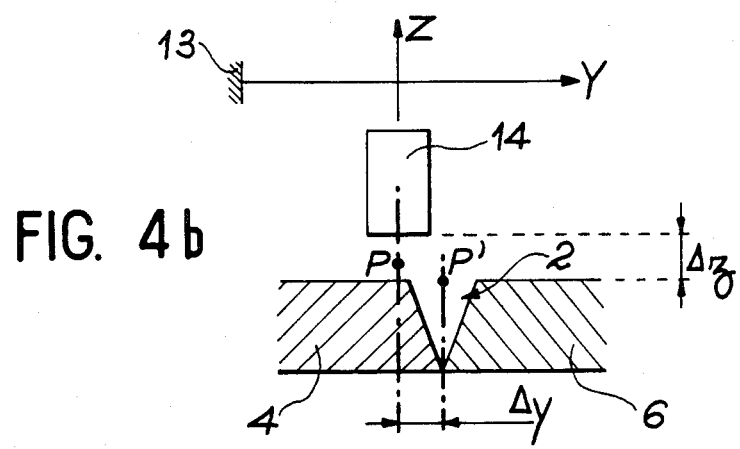
Figure 4C:
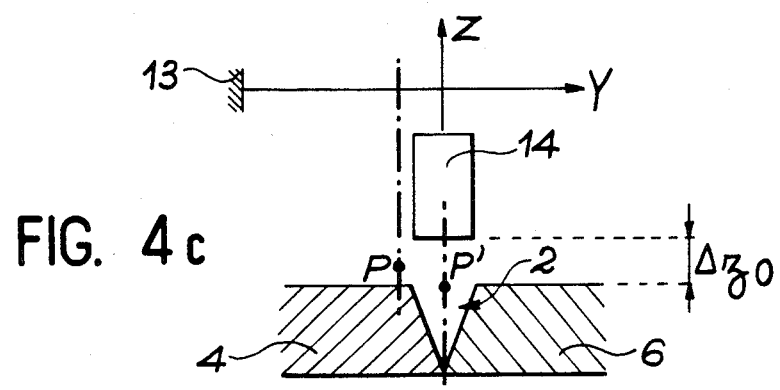

The position of the position detector 14 and consequently of the welding torch, as a function of the state of switches 26, 28, 32, 34 is indicated with reference to FIGS. 4a, 4b and 4c in this special case. They show a view along a section perpendicular to the advance direction of the torch, reference 13 indicating the carrier, which is stationary during resetting.

FIG. 4a illustrates the locking of position detector 14 on resetting point P during the learning of the path. This position corresponds to a zero lateral displacement $\Delta y$ with respect to joint 2 and an altitude $\Delta z_0$ above the surface of parts 4 and 6. The corresponding distance variation signals along axes Y and Z are zero.

During the restoration of the path, the position detector 14 is again brought into a stored resetting point P, which is displaced relative to the point 2 to be followed, as shown in FIG. 4b. The position detector 14 emits signals $V_y$ and $V_z$ corresponding to the displacement $\Delta y$ and $\Delta z$, which makes it possible to bring the position detector by servocontrol into the correct position with respect to the joint, i.e facing point P'. FIG. 4c illustrates this reset position of position detector 14.

It is known to use a position detector, either of a tactile nature, or of an optical nature. These detectors can be difficult to use in certain applications, such as welding, due to the difficult environmental conditions, e.g. heat, vibrations, light radiation due to the torch, etc.

For example, a description will be given of another type of position detector comprising an eddy current probe, which is more suitable for welding. The use of such a detector is limited to the case where the object above which the position detector moves is of a metallic nature.

The principle of such a probe is to supply a coil with a high frequency sinusoidal current, so as to produce an alternating field, which induces in an electricity-conducting material part facing the probe, eddy currents which on return produce a field opposing the initial field and modifying the coil impedance. The coil impedance variations consequently indicate the position of the coil relative to the facing part and relative to an interruption of said part.

Figure 5A:
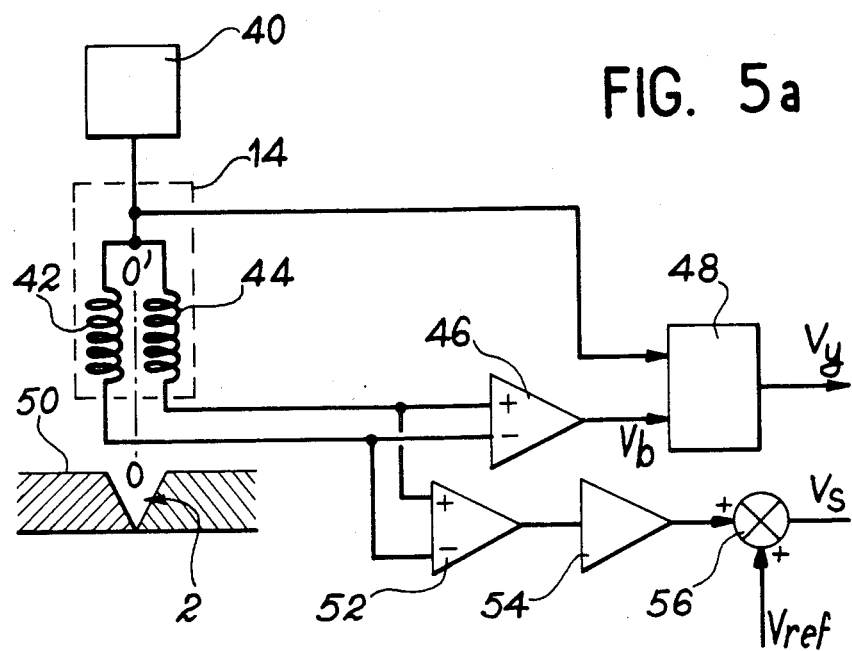
FIG. 5a shows an embodiment of the position detector of the eddy current probe type.

FIG. 5a illustrates an embodiment of this eddy current probe. The latter essentially comprises an oscillator 40, two coils 42, 44 forming the position detector 14 and a processing circuit supplying signals $V_y$ and $V_z$ indicating the distance between the position detector and the resetting point P', i.e. the distance between the torch and the line to be followed.

The oscillator supplies the same signal to two coils 42, 44, each of which phase displaces this signal as a function of its position relative to joint 2. These phase-displaced signals are received in a differential amplifier 46, which supplies a signal $V_b$. This signal is applied to a known processing means 48, into which is also fed the signal supplied by oscillator 40. These processing means supply the signal $V_t$ representing the phase difference between the signal coupled to each of the coils and that with respect to the terminals of the coils.

Figure 5B:
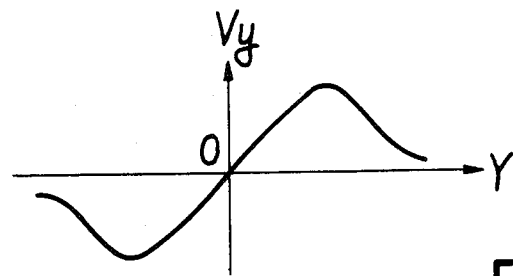
FIGS. 5b and 5c illustrate the electrical signals supplied by the probe as a function, respectively, of the lateral displacement of the position detector with respect to the axis of the joint and of the height of the position detector above the surface of the parts forming the joint.

The configuration of this signal is shown in FIG. 5b as a function of the lateral displacement of axis OO' of the probe relative to the axis of joint 2. This signal $V_y$ is zero when the two axes coincide. It is negative when the probe is on one side of the joint and positive when the probe is on the other side. Thus, this signal can be used for controlling the position of the position detector to reset it in the axis of the joint.

The voltage at the terminals of each of the coils 42, 44 is also received in an adder 52, which supplies a sinusoidal signal, whose d.c. component is obtained by means of an integrator 54. To this d.c. voltage signal supplied by said integrator is added a displacement signal $v_{ref}$ in an adder 56. Signal $V_z$ represents the sum of the signals at the terminals of the probe coils.

Figure 5C:
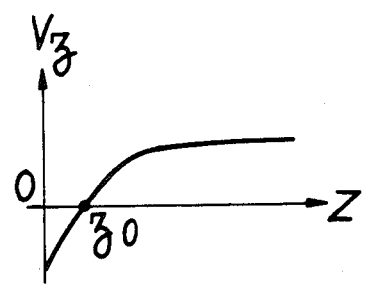

FIG. 5c shows the configuration of signal $V_z$ as a function of the distance between the coils and the surface 50 of the parts to be welded. The distance $\Delta z_0$ for which the voltage $V_z$ is zero is fixed by the reference voltage $v_{ref}$. Thus, this voltage signal $V_s$ can be used for the servocontrol of the distance of the detector relative to the surface of the parts to be welded.

What is claimed is:

1. A process for the resetting of the path of a member fixed to a carrier forced to automatically follow a stored line, the object of the process being to reset the member to a real line described with respect to an object and which can diverge from the stored line, the position of the line to be followed on the object being indicated by a resetting position associated with the object, wherein the process comprises:

displacing the carrier relative to the object to bring it into a stored resetting position, the member being locked to the carrier in a reference position during this displacement, detecting by means of a position detector fixed to said member an offset between the stored resetting position from the resetting position associated with the object, unlocking the member to allow a movement of said member relative to the carrier, translating said member with said detector relative to the carrier and the object in order to cancel out said offset, relocking the member relative to the carrier in the reset position, and displacing the carrier relative to the object to bring it to the start of the stored path, the member thus being positioned on the line to be followed whereby the resetting of the member does not affect the stored line followed by the carrier.

2. A process according to claim 1, wherein the resetting position associated with the object is a point on the line to be followed.

3. Apparatus for resetting the path of a member automatically forced by a carrier guided by a robot to follow a stored line, on a real line described with respect to an object, said apparatus comprising a position detector fixed to the member and supplying at least one displacement signal for the member relative to the real line, each displacement signal corresponding to a displacement in a predetermined direction, said position detector and said member being fixed to the carrier via a system that includes, for each predetermined direction, a translation means for the translation in a given direction of the member and the position detector relative to the carrier, a position coder associated with said translation means, servocontrol means for controlling the translation means to adjust the position of said member along said translation direction, and plural state switching means connected to said servocontrol means, said switching means having a first state that in conjunction with said control means causes the translation means to lock the position of the said member relative to the carrier, a second state that causes the translation means to move said member to a reference position with respect to the carrier and a third state that causes the translation means to move said member to a reference position with respect to the line to be followed by cancelling out distance variation signals from the position detector whereby the resetting of the member does not affect the stored line followed by the carrier.

4. Apparatus according to claim 3, wherein the switching means are controlled by binary signals produced by the robot guiding the member.

* * * * *